United States Patent
Gomi et al.

(10) Patent No.: US 7,492,115 B2
(45) Date of Patent: Feb. 17, 2009

(54) LEGGED MOBILE ROBOT

(75) Inventors: Hiroshi Gomi, Wako (JP); Kazushi Hamaya, Wako (JP); Hitoshi Toyoda, Wako (JP); Yoshinari Takemura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 831 days.

(21) Appl. No.: 10/525,222

(22) PCT Filed: Aug. 7, 2003

(86) PCT No.: PCT/JP03/10076

§ 371 (c)(1),
(2), (4) Date: Feb. 22, 2005

(87) PCT Pub. No.: WO2004/020159

PCT Pub. Date: Mar. 11, 2004

(65) Prior Publication Data

US 2008/0203955 A1    Aug. 28, 2008

(30) Foreign Application Priority Data

Aug. 28, 2002    (JP)    ............................. 2002-248467

(51) Int. Cl.
*B25J 9/18*    (2006.01)

(52) U.S. Cl. ............................. 318/568.11; 318/568.16; 318/568.21

(58) Field of Classification Search ................. 318/567, 318/568.11, 568.12, 568.16, 568.2, 568.21
See application file for complete search history.

(56) References Cited

U.S. PATENT DOCUMENTS

| 4,738,583 | A | * | 4/1988 | Macconochie et al. ...... 414/735 |
| 4,797,061 | A |   | 1/1989 | Munakata |
| 4,834,200 | A |   | 5/1989 | Kajita |
| 5,151,859 | A | * | 9/1992 | Yoshino et al. ............... 701/23 |
| 5,271,292 | A |   | 12/1993 | Sawada et al. |
| 5,445,235 | A | * | 8/1995 | Gomi et al. .................. 180/8.6 |
| 5,455,497 | A | * | 10/1995 | Hirose et al. .......... 318/568.12 |
| 7,240,747 | B2 |   | 7/2007 | Miyazaki et al. |

FOREIGN PATENT DOCUMENTS

| EP | 236109 A1 | 9/1987 |
| EP | 0 433 096 A2 | 6/1991 |
| EP | 1 083 120 A2 | 3/2001 |
| JP | 60-131175 A | 7/1985 |
| JP | 62-187671 A | 8/1987 |
| JP | 07-227482 | 8/1995 |
| JP | 09-057669 | 3/1997 |
| JP | 09-066479 | 3/1997 |

(Continued)

*Primary Examiner*—Rina I Duda
(74) *Attorney, Agent, or Firm*—Squire, Sanders & Dempsey, LLP

(57) ABSTRACT

In a legged mobile robot (1), each leg (2) has at least a first joint (16) and a second joint (18, 20) located below the first joint in the gravitational direction, and the actuator that drives the second joint (54, 56) is located at least one of a position same as that of the first joint and a position (28) above the first joint in the gravitational direction. With this, it becomes possible to lighten the weight of the ground-contacting ends of the legs and thereby provide a legged mobile robot enabling reduction of the inertial forces occurring in the legs during moving, particularly during high-speed moving.

12 Claims, 8 Drawing Sheets

FOREIGN PATENT DOCUMENTS

| | | |
|---|---|---|
| JP | 09-239635 | 9/1997 |
| JP | 2001-260058 | 9/2001 |
| JP | 2002-166385 | 6/2002 |
| JP | 2002-210682 | 7/2002 |
| WO | WO 02/28600 A2 | 4/2002 |
| WO | WO 02/40228 A1 | 5/2002 |

\* cited by examiner

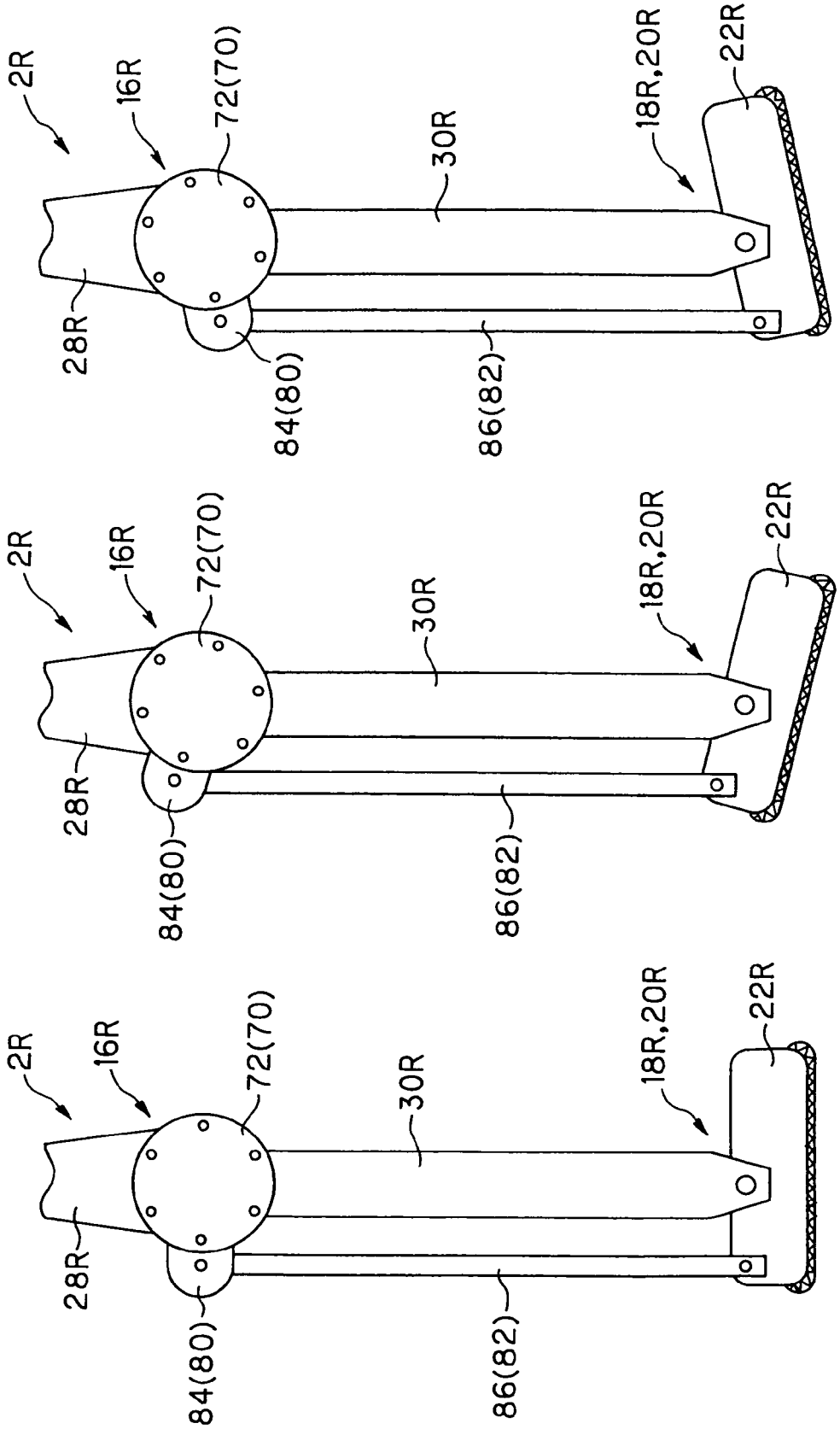

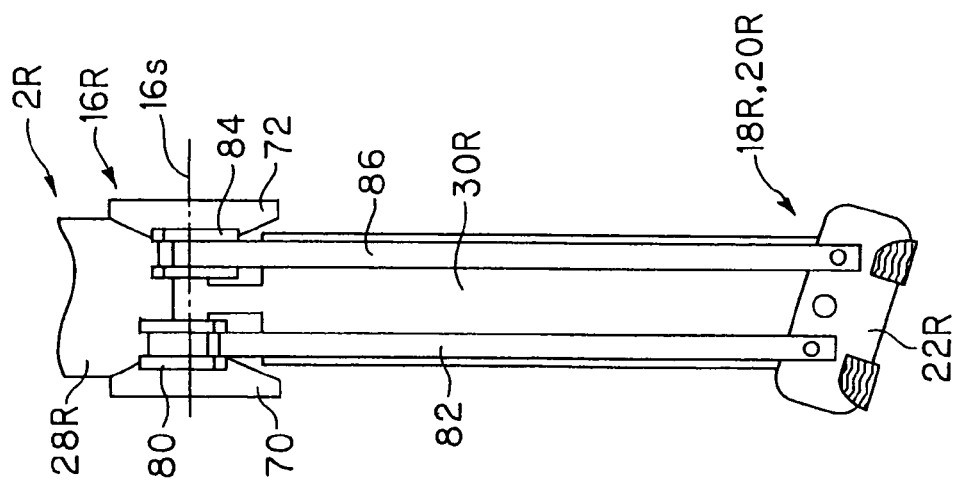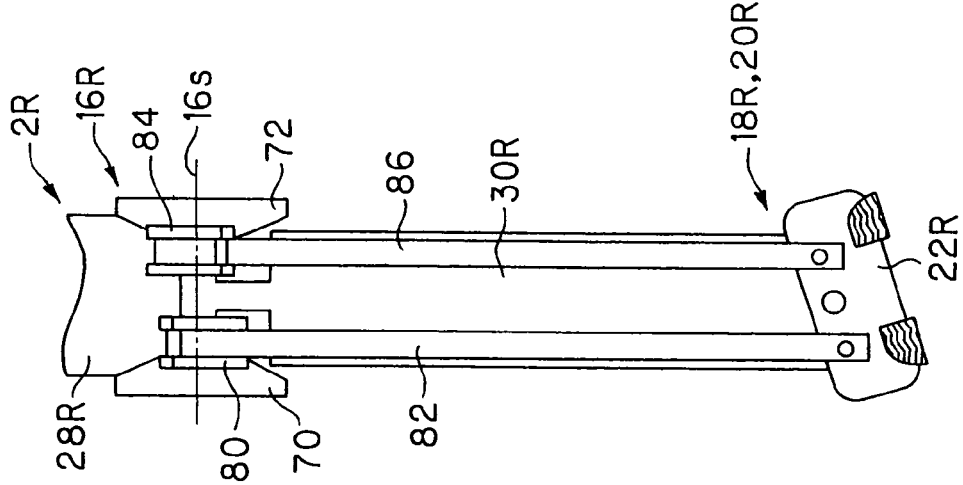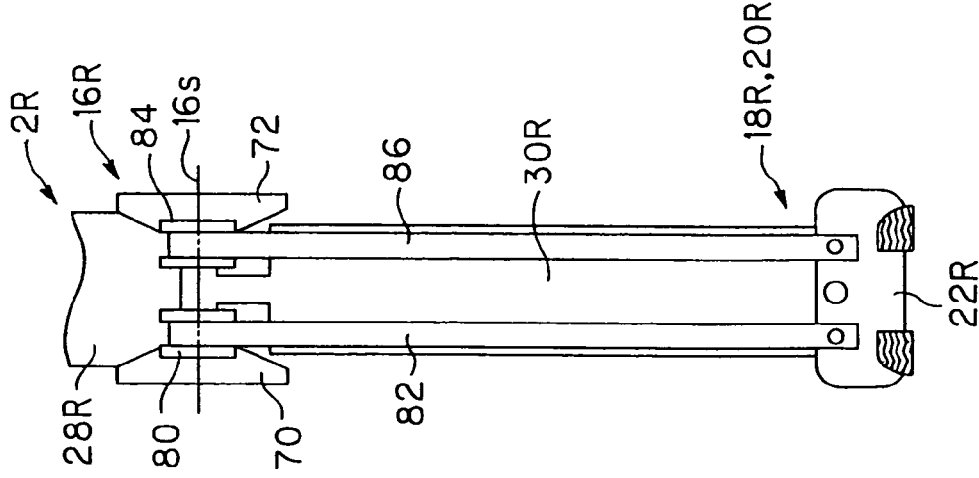

LEGGED MOBILE ROBOT

TECHNICAL FIELD

The present invention relates to a legged mobile robot, more particularly to the legs of a legged mobile robot.

BACKGROUND ART

Known technologies relating to legged mobile robots, particularly to the legs of legged mobile robots, include, for example, that set out in Japanese Patent No. 3293952. This prior art configuration secures driving forces necessary for walking by installing electric motors for driving the knee joints at the thigh links, installing electric motors for driving the ankle joints at the shank links, and driving speed reducers installed coaxially with the joint axes through belts.

When a legged mobile robot is caused to move, particularly when it is caused to move at high speed, large inertial forces are produced at the legs. It is therefore preferable to lighten the weight of the legs, particularly the ground-contacting ends thereof (ends contacting the floor surface; i.e., the distal ends), so as to reduce the inertial forces occurring in the legs during moving. However, the aforesaid prior art leaves room for improvement in the point of inertial force reduction because the weight of the ground-contacting ends of the legs is increased owing to the installation of the electric motors for driving the ankle joints at the shank links and the installation of the speed reducers coaxially with the ankle joint axes.

DISCLOSURE OF THE INVENTION

An object of the present invention is therefore to lighten the weight of the ground-contacting ends of the legs and thereby provide a legged mobile robot enabling reduction of the inertial forces occurring in the legs during moving.

In order to achieve the object, the present invention is configured, to have a legged mobile robot equipped with articulated legs such that it moves by driving each leg by an actuator associated therewith: characterized in that: each leg has at least a first joint and a second joint located below the first joint in the gravitational direction; and that the actuator that drives the second joint is located at least one of a position same as that of the first joint and a position above the first joint in the gravitational direction. Thus, since it is configured such that each leg has at least a first joint and second joint located below the first joint in the gravitational direction; and that the actuator that drives the second joint is located at least one of a position same as that of the first joint and a position above the first joint in the gravitational direction, it becomes possible to lighten the weight of the ground-contacting ends of the legs (distal end side, i.e., the side of the second joint) and thereby provide a legged mobile robot enabling reduction of the inertial forces occurring in the legs during moving, particularly during high-speed moving.

The present invention is further configured, such that at least one of an output shaft of the actuator that drives the second joint and an output shaft of a transmission element to which an output of the output shaft of the actuator is transmitted, is located coaxially with an axis of the first joint, and the second joint is connected to the output shaft located coaxially with the axis of the first joint to be driven through a rod. Thus, since it is configured such that at least one of an output shaft of the actuator that drives the second joint and an output shaft of a transmission element to which an output of the actuator is transmitted, is located coaxially with an axis of the first joint, and the second joint is connected to the output shaft located coaxially with the axis of the first joint to be driven through a rod made of a rigid body, in addition to the advantages mentioned above, even when the second joint and actuator or the second joint and transmission element are located apart from each other, driving force can be transmitted with good accuracy. Further, the first joint and second joint can be angularly adjusted independently.

The present invention is further configured, such that the second joint has rotation axes that are arranged in at least two different directions. Thus, since it is configured such that the second joint has rotation axes that are arranged in at least two different directions, smooth moving of the robot is made possible.

The present invention is further configured, such that the second joint is driven by a plurality of actuators and is connected to at least one of output shafts of the actuators and output shafts of transmission elements to which outputs of the actuators are transmitted, to be driven through a plurality of rods. Thus, since it is configured such that the second joint is driven by a plurality of actuators and is connected to at least one of output shafts of the actuators and output shafts of transmission elements to which outputs of the output shafts of the actuators are transmitted, to be driven through a plurality of rods, the second joint is driven by a plurality of actuators and is connected to at least one of output shafts of the actuators and output shafts of transmission elements to which outputs of the actuators are transmitted, to be driven through a plurality of rods, in addition to the advantages mentioned above, the driving of the second joint (more specifically, the ankle joints which require large driving force) can be conducted using the sum of the driving forces of a plurality of actuators, and the actuators that drive the second joint can be made compact.

The present invention is further configured, such that the rods are located to be spaced by prescribed distances from axes of the second joints. Thus, since it is configured such that the rods connecting the second joint and the outputs of the actuators (or the transmission elements to which their outputs are transmitted) are located to be spaced by prescribed distances from axes of the second joints, in addition to the advantages mentioned above, the second joint can be driven by a small force.

The present invention is further configured, such that the second joint is one among the joints that the legs have, that is located farthest toward a ground-contacting end. Thus, since it is configured such that the second joint is one among the joints that the legs have, that is located farthest toward a ground-contacting end, the distance between the ground-contact end of the leg and the second joint (ankle joint) can be reduced, thereby enabling to improve the stability of the robot.

BRIEF EXPLANATION OF THE DRAWINGS

FIG. 6A to 6C is a set of schematic diagrams viewing the right leg of the robot shown in FIG. 1 from the right side and elucidating the driving operation of the ankle joint.

FIG. 7A to 7C is a set of schematic diagrams viewing the right leg of the robot shown in FIG. 1 from behind and elucidating the driving operation of the ankle joint.

BEST MODE OF CARRYING OUT THE INVENTION

A legged mobile robot according to an embodiment of the present invention will be explained with reference to the attached drawings in the following.

Figure 1:
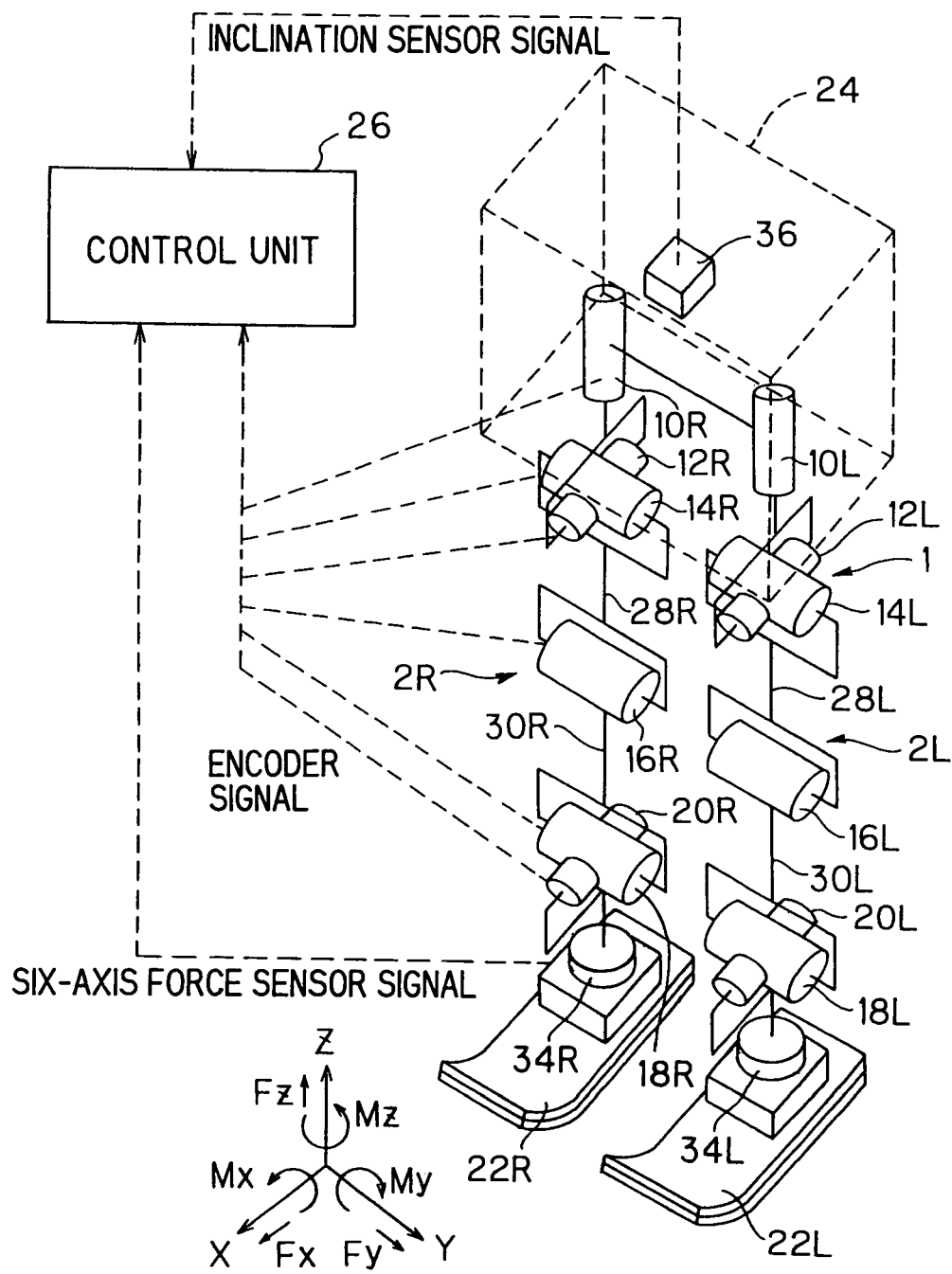
FIG. 1 is a diagram schematically showing a legged mobile robot according to one embodiment of this invention with focus on the joint structure of the legs.

FIG. 1 is a diagram schematically showing the legged mobile robot, more specifically biped walking robot, according to this embodiment with focus on the joint structure of the legs.

As illustrated, the biped walking robot (hereinafter called "robot") 1 has six joints (shown as axes) installed in each of right and left legs 2R, 2L (R designating the right side and L designating the left side; hereinafter the same). The vertically upward six joints comprise, in order from the uppermost, a joint 10R, 10L (R designating the right side and L designating the left side; hereinafter the same) of the crotch (hip) for leg rotation (around the Z axis), a roll direction (around the X axis) joint 12R, 12L of the crotch (hip), a pitch direction (around the Y axis) joint 14R, 14L of the crotch (hip), a pitch direction joint 16R, 16L of the knee, a pitch direction joint 18R, 18L of the ankle, and a roll direction joint 20R, 20L of the ankle. In other words, the crotch joint (or hip joint) is composed of the joints 10R(L), 12R(L) and 14R(L), the knee joint (the aforesaid first joint) of the joint 16R(L), and the ankle joint (the aforesaid second joint) of the joints 18R(L) and 20R(L).

A foot 22R, L is attached below the ankle joints 18R(L), 20R(L) and an upper body (main unit) 24, inside of which is accommodated, inter alia, a control unit 26 composed of a microcomputer, is provided at the top. Further, the crotch joints 10R(L), 12R(L), 14R(L) and the knee joint 16R(L) are connected by a thigh link 28R, L, and the knee joint 16R(L) and the ankle joints 18R(L), 20R(L) are connected by a shank link 30R, L.

In addition, as shown in the same drawing, a conventional six-axis force sensor (floor reaction force detector) 34R(L) is attached between the ankle joints 18, 20R(L) and the ground-contact end of the foot 22R(L) to measure the force components Fx, Fy and Fz of three directions and the moment components Mx, My and Mz of three directions so as to detect presence/absence of leg 2R(L) landing (ground contact) and the floor reaction force (ground contact load) and the like acting on the leg 2R(L) from the floor surface (not shown). Further, an inclination sensor 36 is mounted on the upper body 24 to detect inclination relative to the Z-axis (vertical direction (gravitational direction)) and the angular velocity thereof. Moreover, the electric motors that drive the respective joints are provided with rotary encoders (not shown) for detecting the amount of rotation thereof.

The outputs of the six-axis force sensors 34R(L), the inclination sensor 36 and the like are input to the control unit 26. Based on data stored in a memory (not shown) and the input detection values, the control unit 26 calculates control values for the electric motors (not shown in the drawing) that drive the respective joints.

Thus each of the right and left legs 2R, 2L of the robot 1 is imparted with six degrees of freedom and the legs as a whole can be imparted with desired movements to enable arbitrary moving in three-dimensional space by operating the motors that drive the 6×2=12 joints based on the control values calculated by the control unit 26. Although arms and a head are connected to the upper body 24, illustration thereof is omitted because the structures thereof are not directly related to the gist of this invention.

The legs 2R, 2L of the robot 1 will now be explained in detail with reference to FIG. 2 and ensuing drawings. While the explanation will be made taking the right leg 2R as an example, it should be noted that because the legs 2R, 2L are laterally symmetrical the following explanation also applies to the leg 2L.

Figure 2:
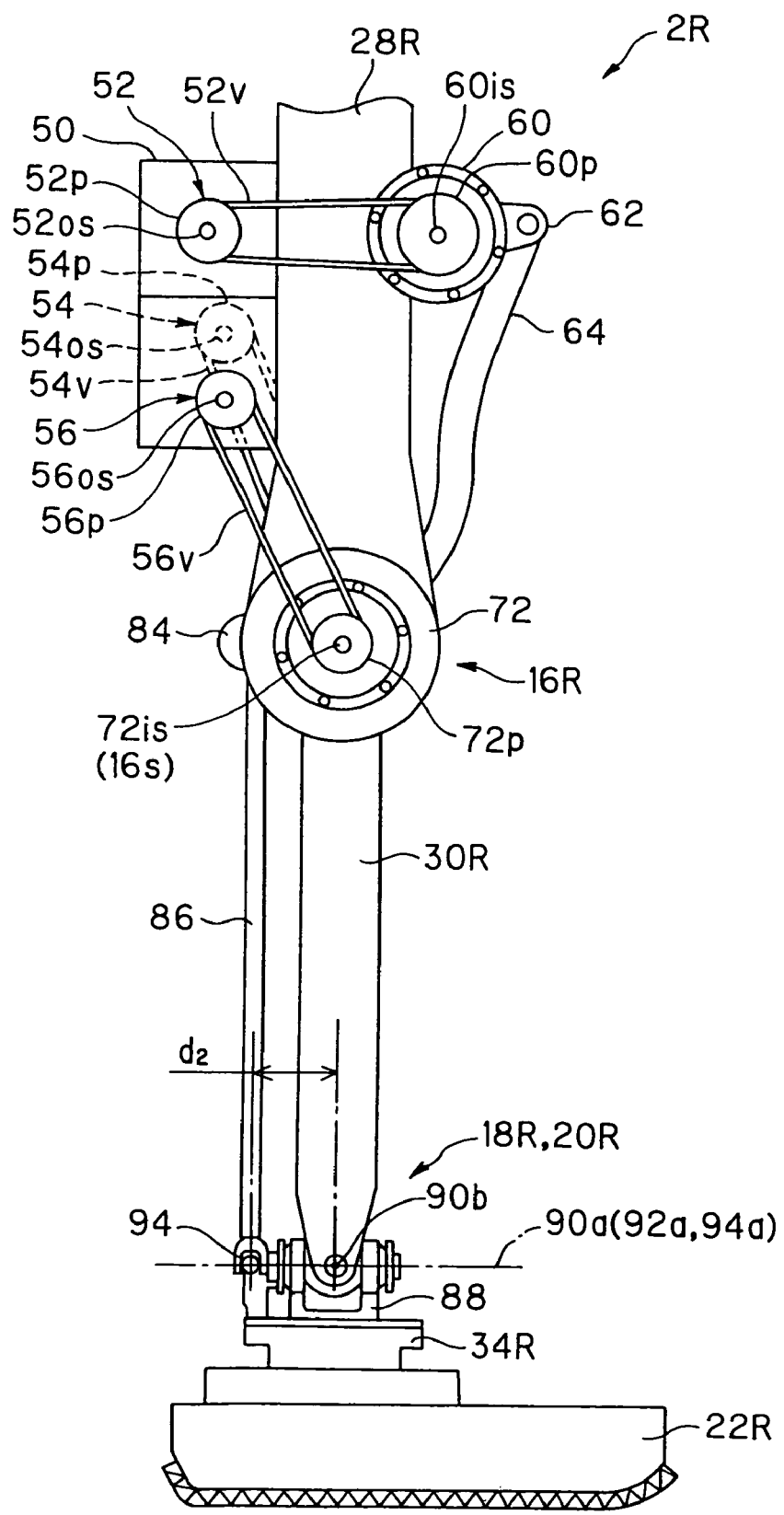
FIG. 2 is a right side view showing in detail the right leg of the legged robot shown schematically in FIG. 1.
Figure 3:
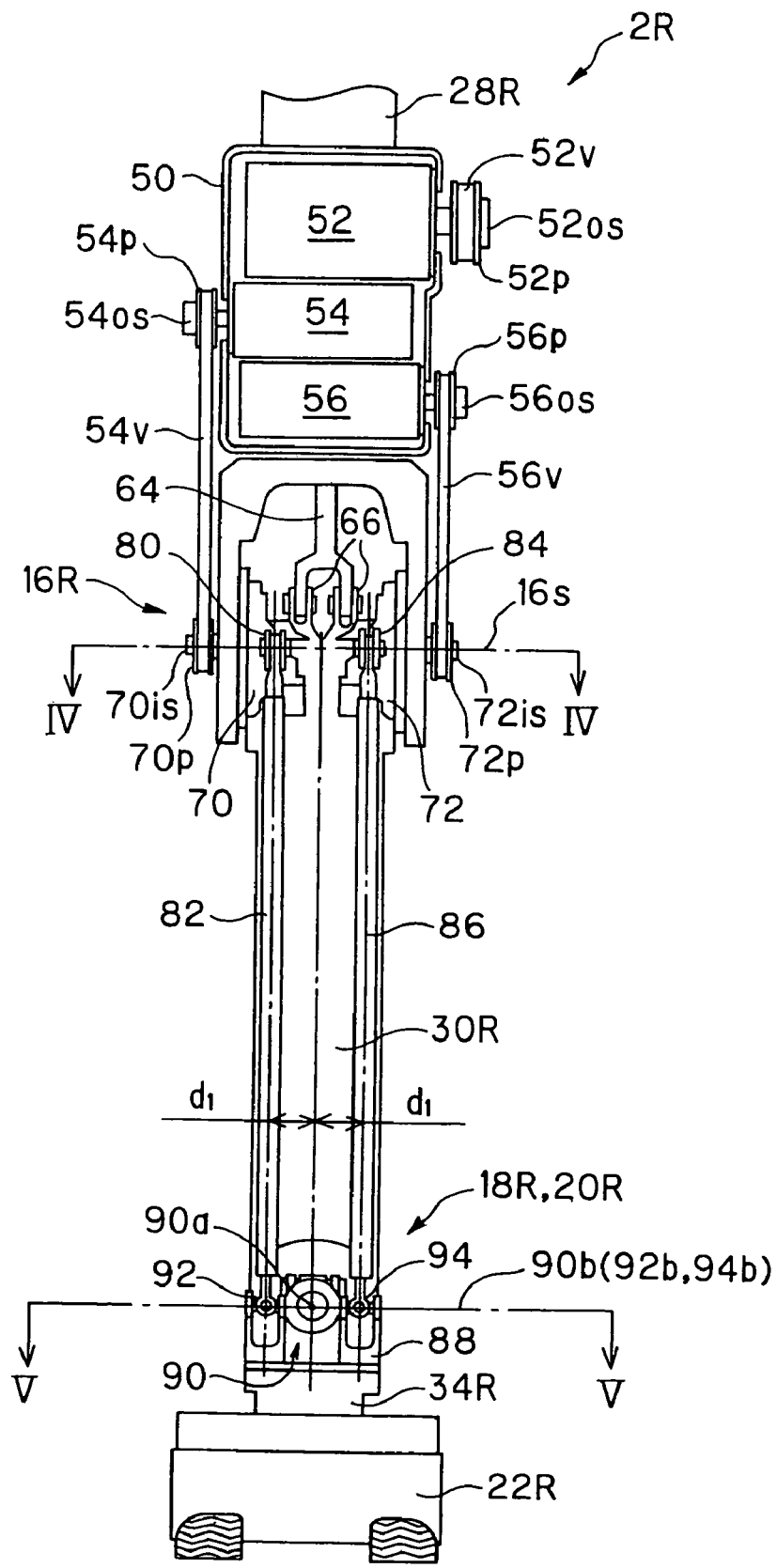
FIG. 3 is a rear view of the leg shown in FIG. 2.

FIG. 2 is a right side view showing in detail the leg 2R shown schematically in FIG. 1. Illustration of the vicinity of crotch joints is omitted in the drawing. Further, FIG. 3 is a rear view of the leg 2R shown in FIG. 2.

As shown in the two drawings, a motor case 50 is mounted on the rear of the thigh link 28R and an electric motor (hereinafter called "knee joint electric motor") 52 for driving the knee joint 16R is located inside an upper part of the motor case 50. Further, a first electric motor (hereinafter called "first ankle joint electric motor") 54 for driving the ankle joints 18R, 20R is located inside a lower part of the motor case 50 and a second electric motor (hereinafter called "second ankle joint electric motor") 56 for driving the ankle joints 18R, 20R is located below the first ankle joint electric motor 54. The first ankle joint electric motor 54 and second ankle joint electric motor 56 are arranged so as to orient their output shafts 54os and 56os oppositely in the lateral direction (Y-axis direction in FIG. 1).

Further, a speed reducer or reduction-gear mechanism (hereinafter called "knee joint speed reducer") 60 is located on the front of the thigh link 28R at a position opposite the aforesaid knee joint electric motor 52. A pulley 52p fastened to an output shaft 52os of the knee joint electric motor 52 is connected through a belt 52v to a pulley 60p fastened to an input shaft 60is of the knee joint speed reducer 60, whereby the output of the knee joint electric motor 52 is transmitted to the knee joint speed reducer 60. The knee joint speed reducer 60 is a known Harmonic Drive (registered trademark) and a detailed description thereof will be omitted.

In addition, a rod connector (hereinafter called "knee joint rod connector") 62 is provided on an output shaft (not shown) of the knee joint speed reducer 60 and the upper end of a rod (hereafter called "knee joint rod") 64 made of a rigid body is connected to the knee joint rod connector 62 to be rotatable in the pitch direction (around the Y-axis in FIG. 1).

On the other hand, the bifurcated lower end of the knee joint rod 64 is connected to a shank link side knee joint rod connector 66 formed at the upper end of the shank link 30R, so as to be rotatable in the pitch direction. Thus, the shank link 30R is connected to the knee joint speed reducer 60 through the knee joint rod connector 62 and knee joint rod 64, whereby it is driven in the pitch direction by the output of the knee joint electric motor 52. At such time, the rotation curve of the shank link 30R is the axis 16s of the aforesaid knee joint 16R.

Two speed reducers 70, 72 are located on the axis 16s of the knee joint 16R, one on either side (lateral side) of the knee joint 16R. A pulley 70p fastened to an input shaft 70is of the speed reducer 70 is connected through a belt 54v to a pulley 54p fastened to an output shaft 54os of the aforesaid first ankle joint electric motor 54, whereby the output of the first ankle joint electric motor 54 is transmitted to the speed reducer 70. The speed reducer 70 will be called a "first ankle joint speed reducer" hereinafter.

Further, a pulley 72p fastened to an input shaft 72is of the speed reducer 72 is connected through a belt 56v to a pulley 56p fastened to an output shaft 56os of the aforesaid second ankle joint electric motor 56, whereby the output of the second ankle joint electric motor 56 is transmitted to the speed reducer 72. The speed reducer 72 will be called a "second ankle joint speed reducer" hereinafter. The first ankle joint speed reducer 70 and second ankle joint speed reducer 72 are both known Harmonic Drives whose bases (sections that do not rotate; not shown) are fastened to the shank link 30R.

Figure 4:
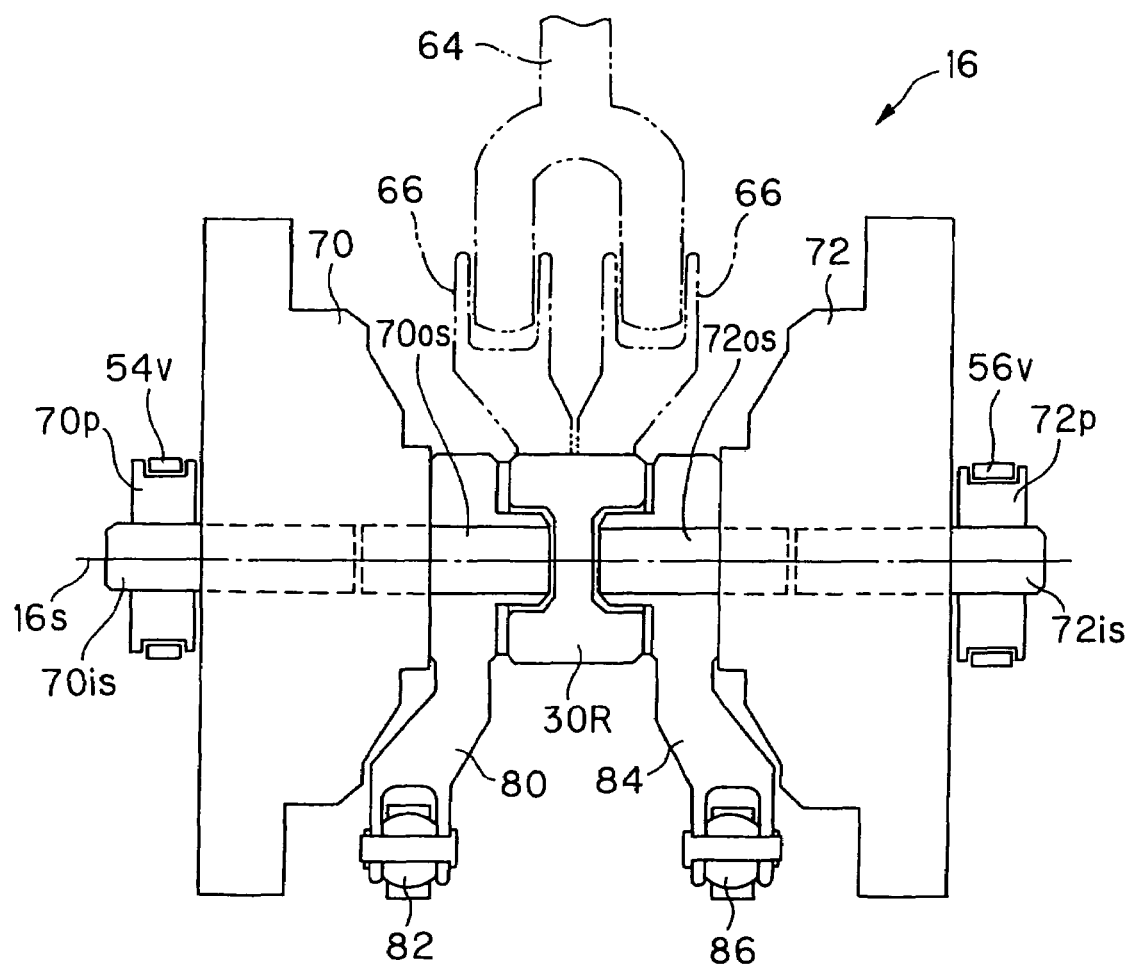
FIG. 4 is a sectional view taken along line IV-IV of FIG. 3.

FIG. 4 is a sectional view taken along line IV-IV of FIG. 3, i.e., a sectional view of the knee joint 16R.

As shown in the same drawing, the input shafts 70*is*, 72*is* and output shafts 70*os*, 72*os* of the first ankle joint speed reducer 70 and second ankle joint speed reducer 72 are all located coaxially with the axis 16*s* of the knee joint 16R. Further, a first ankle joint rod connector 80 is fastened to the output shaft 70*os* of the first ankle joint speed reducer 70, and the upper end of a first ankle joint rod 82 made of a rigid body is connected to the first ankle joint rod connector 80 to be rotatable in the pitch direction. Similarly, a second ankle joint rod connector 84 is fastened to the output shaft 72*os* of the second ankle joint speed reducer 72, and the upper end of a second ankle joint rod 86 made of a rigid body is connected to the second ankle joint rod connector 84 to be rotatable in the pitch direction.

Returning to the explanation of FIG. 2 and FIG. 3, a mount 88 is provided above the six-axis force sensor 34R. A universal joint 90 equipped with rotation axes 90*a* and 90*b* in two different directions in the same plane is installed on the mount 88. The universal joint 90 is connected to the lower end of the shank link 30R, whereby it is connected to the aforesaid foot 22R through the universal joint 90, mount 88 and six-axis force sensor 34R. The universal joint 90 will be called a "shank link connecting universal joint" hereinafter.

Figure 5:
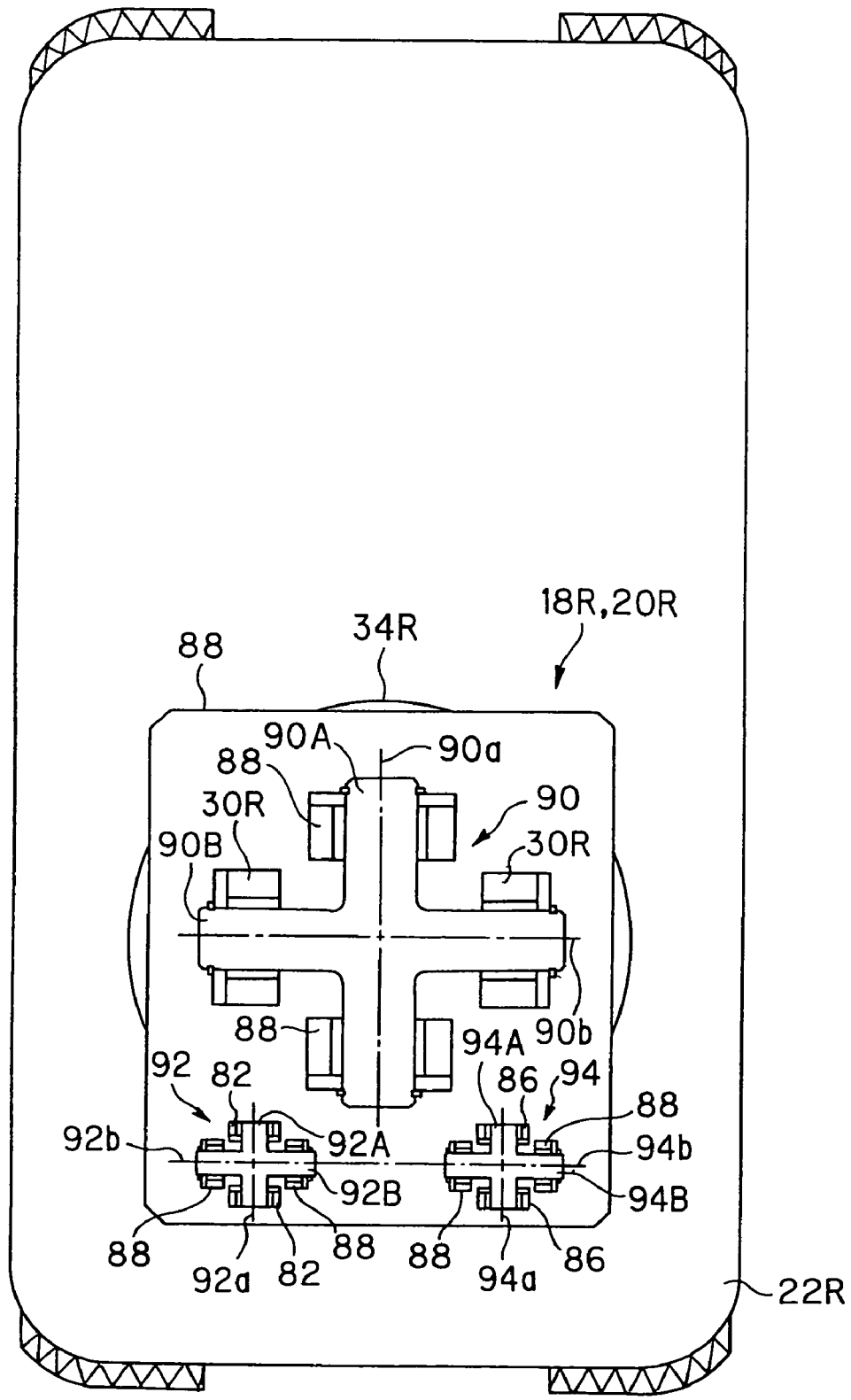
FIG. 5 is a sectional view taken along line V-V in FIG. 3.

FIG. 5 is a sectional view taken along line V-V in FIG. 3, i.e., a sectional view of the ankle joints 18R, 20R.

As shown in the same drawing, the shank link connecting universal joint 90 is equipped with two shafts 90A and 90B that intersect at right angles. The shaft 90A is a roll direction (around the X-axis) rotating shaft that corresponds to the aforesaid joint 20R and whose center of rotation is the rotation axis 90*a*. Further, the opposite ends of the shaft 90A are supported (fastened) by the mount 88.

On the other hand, the shaft 90B is a pitch direction (around the Y-axis) rotating shaft that corresponds to the aforesaid joint 18R and whose center of rotation is the rotation axis 90*b*. Further, the lower end of the bifurcated shank link 30R is fastened to the opposite ends of the shaft 90B. As a result, the ankle joints 18R, 20R are configured to be rotatable about any axis in a plane defined by the roll direction and pitch direction.

Returning to the explanation of FIG. 2 and FIG. 3, rearward of the shank link connecting universal joint 90 on the mount 88 are installed a smaller first rod universal joint 92 and second rod universal joint 94. The lower end of the first ankle joint rod 82 is connected to the first rod universal joint 92 and the lower end of the second ankle joint rod 86 is connected to the second rod universal joint 94.

The first rod universal joint 92 and second rod universal joint 94 will be explained in detail with reference to FIG. 5. The first rod universal joint 92 and second rod universal joint 94 are each equipped with two perpendicularly intersecting shafts 92A and 92B, 94A and 94B. The shafts 92A, 94A are both roll direction (around the X-axis) rotating shafts whose rotation axes 92*a*, 94*a* are located in the same plane as and parallel to the rotation axis 90*a* of the aforesaid shank link connecting universal joint 90. The lower end of the bifurcated first ankle joint rod 82 and the lower end of the second ankle joint rod 86 are respectively connected to the opposite ends of the shafts 92A and 94A.

Further, the shafts 92B, 94B are both pitch direction (around the Y-axis) rotating shafts whose rotation axes 92*b*, 94*b* are located in the same plane as and parallel to the rotation axis 90*b* of the aforesaid shank link connecting universal joint 90. The opposite ends of the shafts 92B, 94B are respectively supported (fastened) by the mount 88. As a result, the lower ends of the ankle joint rods 82, 86 are configured to be rotatable about any axis in a plane defined by the roll direction and pitch direction.

Thus, the ankle joints 18R, 20R are connected through the first ankle joint rod 82 and second ankle joint rod 86 to the first ankle joint speed reducer 70 and second ankle joint speed reducer 72, which are transmission elements for transmitting the outputs of the first ankle joint electric motor 54 and second ankle joint electric motor 56, whereby the ankle joints 18R, 20R are driven by the first ankle joint electric motor 54 and second ankle joint electric motor 56.

Here the first ankle joint speed reducer 70 and second ankle joint speed reducer 72 are arranged coaxially with the axis 16*s* of the knee joint 16R located above the ankle joints 18R, 20R in the gravitational direction, and the first ankle joint electric motor 54 and second ankle joint electric motor 56 are located at the thigh link 28R positioned still further above the knee joint 16R, so that the weight of the ground-contacting end of the leg 2R (distal end; i.e., the ankle joint 18R, 20R end) can be lightened to reduce the inertial force produced in the leg during moving, particularly during high-speed moving.

Moreover, since no speed reducer, electric motor or the like is located at the ankle joints 18R, 20R, the distance between the ground-contact end of the leg 2R and the ankle joints 18R, 20R can be reduced to improve the stability of the robot 1. Further, the distances between ground-contact end of the foot 22R and the six-axis force sensor 34R and between the six-axis force sensor 34R and the ankle joints 18R, 20R can be shortened to enable accurate detection of the size and direction of the floor reaction force acting on the leg 2R.

In addition, smooth moving of the robot 1 is possible because the ankle joints 18R, 20R are constituted by the shank link connecting universal joint 90 to provide the rotation axes 90*a* and 90*b* in two different directions.

Next, the driving operation of the ankle joints 18R, 20R will be explained with reference to FIG. 6 and FIG. 7. FIG. 6A to 6C is a set of schematic diagrams viewing the right leg 2R from the right side and elucidating the driving operation of the ankle joints 18R, 20R. FIG. 7A to 7C is a set of schematic diagrams viewing the right leg 2R from behind and elucidating the driving operation of the ankle joints 18R, 20R.

An explanation follows. Taking the leg 2R shown in FIG. 6A to be in the initial state, when the second ankle joint speed reducer 72 is driven by the second ankle joint electric motor 56 (not shown) to rotate clockwise in the plane of the drawing sheet (i.e., clockwise when the leg 2R is viewed from the right side) and the first ankle joint speed reducer 70 behind the second ankle joint speed reducer 72 is driven by the first ankle joint electric motor 54 (not shown) to rotate clockwise (counterclockwise when viewed from the side of the unshown leg 2L on the left side), the second ankle joint rod connector 84 and second ankle joint rod 86, and also the first ankle joint rod connector 80 and first ankle joint rod 82, are driven upward to drive the foot 22R so as to raise the heel (lower the toe), as shown in FIG. 6B.

Conversely, when the second ankle joint speed reducer 72 is driven by the second ankle joint electric motor 56 to rotate counterclockwise in the plane of the drawing sheet and the first ankle joint speed reducer 70 is driven by the first ankle joint electric motor 54 to rotate counterclockwise (clockwise when viewed from the side of the unshown leg 2L on the left side), the second ankle joint rod connector 84 and second ankle joint rod 86, and also the first ankle joint rod connector 80 and first ankle joint rod 82, are driven downward to drive the foot 22R so as to lower the heel (raise the toe), as shown in FIG. 6C. Thus, the ankle joints 18R, 20R are driven in the pitch direction (around the Y-axis) by driving the first ankle joint rod 82 and second ankle joint rod 86 in the same direction.

On the other hand, taking the leg 2R shown in FIG. 7A to be in the initial state, when the first ankle joint rod 82 is driven downward and the second ankle joint rod 86 is driven upward, the foot 22R is driven to lower its left side (raise its right side), as shown in FIG. 7B.

Further, when the first ankle joint rod 82 is driven upward and the second ankle joint rod 86 is driven downward, the foot 22R is driven to raise its left side (lower its right side), as shown in FIG. 7C. In other words, the ankle joints 18R, 20R are driven in the roll direction (around the X-axis) by driving the first ankle joint rod 82 and second ankle joint rod 86 in opposite directions.

Since the driving of the ankle joints 18R, 20R, which requires large driving force, can in this manner be conducted using the sum of the driving forces of two electric motors (the first ankle joint electric motor 54 and second ankle joint electric motor 56), the ankle joint electric motors 54, 56 can be made compact.

In addition, the first ankle joint rod 82 and second ankle joint rod 86 are, as shown in FIG. 3, located a prescribed distance d1 sideways from the roll direction rotation axis 90a of the shank link connecting universal joint 90 and, as shown in FIG. 2, located a prescribed distance d2 rearward from the pitch direction rotation axis 90b of the shank link connecting universal joint 90. Namely, the ankle joints 18R, 20R can be driven by a small force because the points of force application (first rod universal joint 92 and second rod universal joint 94) are located at positions a prescribed distance apart from the fulcrum (shank link connecting universal joint 90).

Further, driving force can be transmitted with good accuracy even though the ankle joint speed reducers 70, 72 are located apart from the ankle joints 18R, 20R because the first ankle joint speed reducer 70 and ankle joints 18R, 20R, and the second ankle joint speed reducer 72 and ankle joints 18R, 20R, are connected to be driven through the first ankle joint rod 82 and second ankle joint rod 86, which are both rigid bodies.

This will be explained in detail with reference to FIG. 2. The second ankle joint electric motor 56 and second rod universal joint 94, for example, cannot be connected by a rod made of a rigid body because their relative positions vary with driving of the knee joint 16R. However, the relative positions of the axis 16s of the knee joint 16R and the second rod universal joint 94 do not vary with driving of the knee joint 16R, so that by locating an electric motor or the output shaft of a speed reducer (transmission element) for transmitting the output thereof coaxially with the axis 16s of the knee joint 16R, they can be connected by a rod made of a rigid body.

Figure 8:
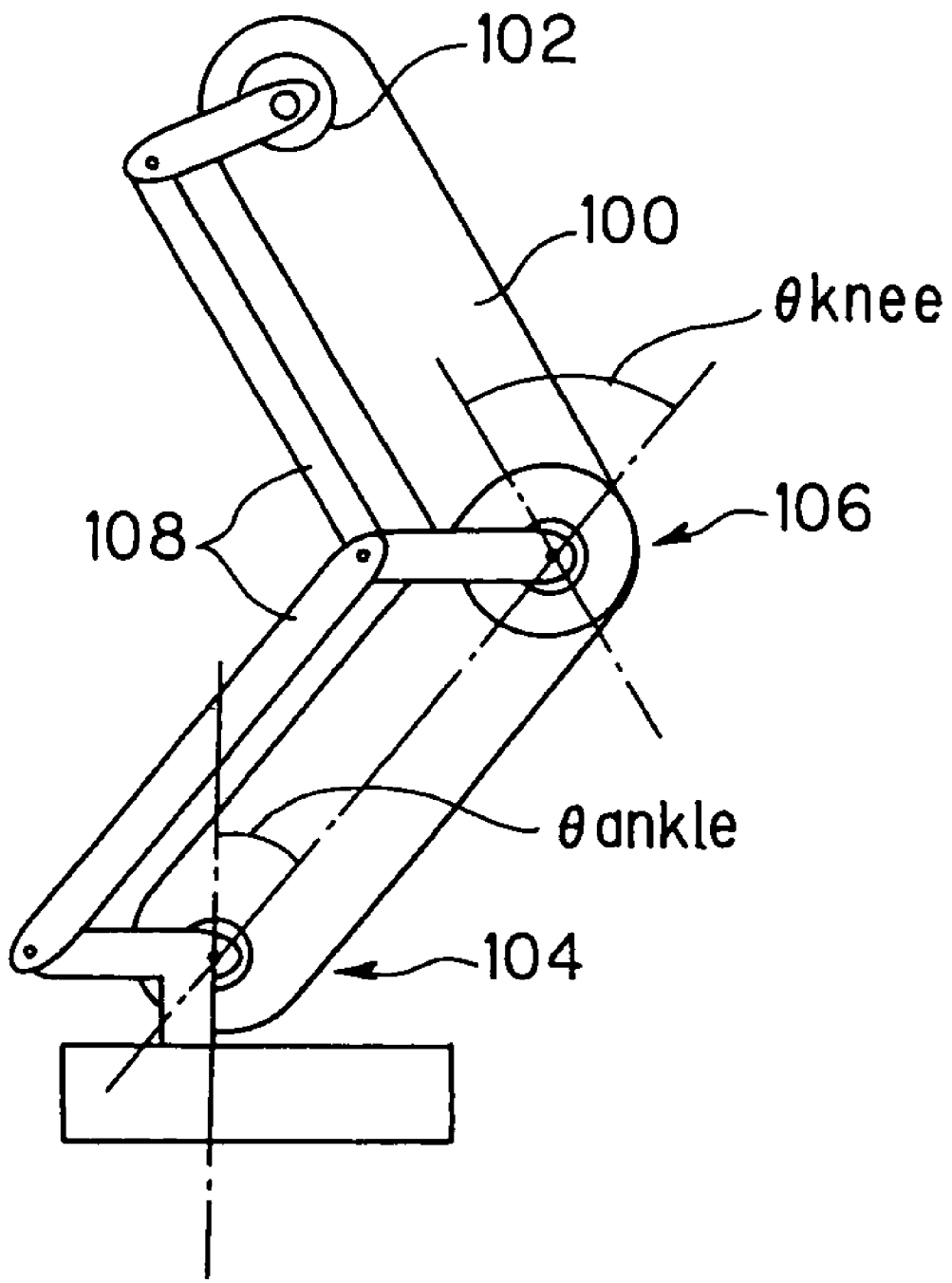
FIG. 8 is an explanatory view showing a connection of an ankle joint and an actuator that drives it.

In the foregoing, it is also conceivable, as shown in FIG. 8 for example, to connect an electric motor 102 located at a thigh link 100 and an ankle joint 104 by a parallel linkage 108 made of a rigid body and having a fulcrum at a knee joint 106. When connection is made by such a parallel linkage 108, however, a problem arises in that it is difficult to angularly adjust the knee joint 106 and ankle joint 104 independently because the angle (bending angle) θ ankle of the ankle joint changes with change in the angle (bending angle) θ knee of the knee joint 106. Specifically, defining the change in the angle θ knee of the knee joint 106 as θ move, θ ankle becomes approximately the sum of θ ankle and θ move. In other words, θ ankle changes by θ move.

On the other hand, in the legged mobile robot 1 according to this invention, change in the angle of the knee joint 16R(L) has substantially no effect on the angles of the ankle joints 18R(L), 20R(L). To be precise, the relative angle between the aforesaid base (section fastened to the shank link 30 that does not rotate) and the input shaft 70is, 72is changes when the angle of the knee joint 16R(L) changes, so that the ankle joints 18R(L), 20R(L) are driven the pitch direction (around the Y-axis) by an angle reduced in proportion to the reduction ratio of the speed reducer 70, 72. Specifically, defining the change in the angle θ knee of the knee joint 16R(L) as θ move, angle θ ankle of the ankle joint changes by approximately θ move/reduction ratio.

However, the reduction ratio of the speed reducers 70, 72 ordinarily needs to be set large because, as mentioned earlier, large driving forces are required for driving the ankle joints. θ move/reduction ratio therefore becomes a very small value, so that the change in the angle of the knee joint 16R(L) has substantially no effect on the angles of the ankle joints 18R (L), 20R(L). Moreover, since the rotational motion (rotational motion in the pitch direction) of the knee joint 16R(L) is totally unrelated to the rotational motion in the roll direction (around the X-axis) of the ankle joints 18R(L), 20R(L), the motion of the knee joint 16R(L) has no effect on roll direction motion of the ankle joints 18R(L), 20R(L). The knee joint 16R(L) and the ankle joints 18R(L), 20R(L) can therefore be angularly adjusted independently.

As set out in the foregoing, the legged mobile robot according to this embodiment is configured such that in a legged mobile robot (robot) 1 equipped with articulated legs such that it moves by driving each leg by an actuator associated therewith so as to be equipped with the articulated legs 2R(L) such that it moves by driving each leg by an actuator associated therewith, each leg has at least a first joint (knee joint 16R(L)) and a second joint (ankle joint 18R(L), 20R(L)) located below the first joint in the gravitational direction; and the actuator that drives the second joint (first ankle joint electric motor 54, second ankle joint electric motor 56) is located at least one of a position same as that of the first joint and a position (thigh links 28R(L)) above the first joint in the gravitational direction.

Further, it is configured such that, at least one of an output shaft (54os, 56os) of the actuator that drives the second joint and an output shaft (70os, 72os) of a transmission element (first ankle joint speed reducer 70, second ankle joint speed reducer 72) to which an output of the output shaft of the actuator is transmitted, is located coaxially with an axis (16s) of the first joint, and the second joint is connected to the output shaft located coaxially with the axis of the first joint to be driven through a rod (first ankle joint rods 82, second ankle joint rods 86).

Further, it is configured such that the second joint has rotation axes (90a and 90b) that are arranged in at least two different directions.

Further, it is configured such that the second joint is driven by a plurality of actuators (first ankle joint electric motors 54, second ankle joint electric motors 56) and is connected to at least one of output shafts (54os, 56os) of the actuators and output shafts (70os, 72os) of transmission elements (first ankle joint speed reducers 70, second ankle joint speed reducers 72) to which outputs of the output shafts of the actuators are transmitted, to be driven through a plurality of rods (first ankle joint rods 82, second ankle joint rods 86).

Further, it is configured such that the rods are located to be spaced by prescribed distances (d1, d2) from axes (90*a*, 90*b*) of the second joints.

Further, it is configured such that the second joint is one (ankle joints) among the joints that the legs have, that is located farthest toward a ground-contacting end.

Although explanation was made in the foregoing taking a biped walking robot equipped with two legs as an example of a legged mobile robot, the legged mobile robot can be one equipped with one or three or more legs.

Further, although the ankle joints are configured to be driven by two electric motors, it is possible to use one or three or more electric motor.

Further, although the speed reducers are located coaxially with the axes of the knee joints, the electric motor can be directly installed.

Further, the electric motors that drive the knee joints (or the transmission elements that transmit the outputs thereof) can be located coaxially with the axes of crotch joints and these be connected by rods.

Further, other than rods made of rigid bodies it is possible to use, for instance, push-pull cables and the like.

Further, the actuators used are not limited to electric motors and can be other kinds of actuators.

INDUSTRIAL APPLICABILITY

According to this invention, a legged mobile robot is configured such that legs are equipped with at least first joints and second joints located thereunder in the gravitational direction and actuators for driving the second joints are located at either the same position as the first joints or a position thereabove in the gravitational direction, so that the weight of the ground-contacting end of the legs (distal end; i.e., the second joint end) can be lightened to reduce the inertial forces produced in the legs during moving, particularly during high-speed moving.

The invention claimed is:

1. A legged mobile robot having a body, and a plurality of articulated legs each connected to the body such that it moves by driving each leg by an actuator associated therewith, comprising:
    a first joint installed at each leg; and
    a second joint installed at each leg at a location below the first joint in the gravitational direction;
    wherein the actuator that drives the second joint is located at least one of a position same as that of the first joint and a position above the first joint in the gravitational direction, and at least one of an output shaft of the actuator that drives the second joint and an output shaft of a transmission element to which an output of the output shaft of the actuator is transmitted, is located coaxially with an axis of the first joint, and the second joint is connected to the output shaft located coaxially with the axis of the first joint to be driven through a rod.

2. The legged mobile robot according to claim 1, wherein the second joint has rotation axes that are arranged in at least two different directions.

3. The legged mobile robot according to claim 1, wherein the second joint is driven by a plurality of actuators and is connected to at least one of output shafts of the actuators and output shafts of transmission elements to which outputs of the output shafts of the actuators are transmitted, to be driven through a plurality of rods.

4. The legged mobile robot according to claim 3, wherein the rods are located to be spaced by prescribed distances from axes of the second joints.

5. The legged mobile robot according to claim 1, wherein the second joint is one among the joints that the legs have, that is located farthest toward a ground-contacting end.

6. A legged mobile robot having a body, and a plurality of articulated legs each connected to the body such that it moves by driving each leg by an actuator associated therewith, comprising:
    a first joint installed at each leg;
    a second joint installed at each leg at a location below the first joint in the gravitational direction; and
    a speed reducer to which an output of the actuator that drives the second joint is transmitted;
    wherein an input shaft of the speed reducer is located coaxially with an axis of the first joint.

7. The legged mobile robot according to claim 6, wherein an output shaft of the speed reducer is located coaxially with the axis of the first joint, and the second joint is connected to the output shaft of the speed reducer to be driven through a rod.

8. The legged mobile robot according to claim 6, wherein the second joint has rotation axes that are arranged in at least two different directions.

9. The legged mobile robot according to claim 6, wherein the second joint is driven by a plurality of actuators and is connected to output shafts of the speed reducers to which outputs of the actuators are transmitted, to be driven through a plurality of rods.

10. The legged mobile robot according to claim 9, wherein the rods are located to be spaced by prescribed distances from axes of the second joints.

11. The legged mobile robot according to claim 6, wherein the second joint is one among the joints that the legs have, that is located farthest toward a ground-contacting end.

12. A legged mobile robot having a body, and a plurality of articulated legs each connected to the body such that it moves by driving each leg by an actuator associated therewith, comprising:
    a first joint installed at each leg;
    a second joint installed at each leg at a location below the first joint in the gravitational direction;
    a link that connects the first joint and the second joint; and
    a speed reducer to which an output of the actuator that drives the second joint is transmitted;
    wherein a base of the speed reducer is located at the link that connects the first joint and the second joint.

* * * * *